(12) United States Patent
Kato et al.

(10) Patent No.: US 7,003,193 B2
(45) Date of Patent: Feb. 21, 2006

(54) MINIATURE MOVABLE DEVICE

(75) Inventors: Yoshichika Kato, Tachikawa (JP); Keiichi Mori, Tokyo (JP); Satoshi Yoshida, Tama (JP); Kenji Kondou, Chofu (JP); Yoshihiko Hamada, Akiruno (JP); Osamu Imaki, Hachioji (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 0 days.

(21) Appl. No.: 10/958,722

(22) Filed: Oct. 4, 2004

(65) Prior Publication Data

US 2005/0078908 A1   Apr. 14, 2005

(30) Foreign Application Priority Data

Oct. 10, 2003   (JP)   ............................. 2003-352134

(51) Int. Cl.
G02B 6/26   (2006.01)
G02B 6/00   (2006.01)

(52) U.S. Cl. ........................................ 385/18; 385/147
(58) Field of Classification Search ........ 385/130–140, 385/83, 147, 15, 18, 83.88; 216/24, 39, 42; 359/290

See application file for complete search history.

(56) References Cited

U.S. PATENT DOCUMENTS

| | | | |
|---|---|---|---|
| 6,229,640 B1 | 5/2001 | Zhang | |
| 6,315,462 B1 * | 11/2001 | Anthamatten et al. | ........ 385/83 |
| 2002/0102059 A1 | 8/2002 | Cho et al. | |
| 2003/0027370 A1 | 2/2003 | Helin | |
| 2004/0184132 A1 * | 9/2004 | Novotny et al. | ............ 359/290 |
| 2005/0014368 A1 * | 1/2005 | Yoshioka et al. | ........... 438/689 |

FOREIGN PATENT DOCUMENTS

WO   WO 9414187   6/1994

OTHER PUBLICATIONS

Larsen, et al.: "MEMS device for bending test: measurements of fatigue and creep of electroplated nickel," pp. 156-164, paper presented at 15th IEEE Conference, Las Vegas, US, Jan. 2002; Elsevier Science, 2003 XP 4400395.
Li, et al.: Focused ion Beam (FIB) Nano-Machining and FIB Moiré Technique for Strain Analysis in MEMS/NEMS Structures and Devices,: 2003 IEEE, pp. 674-677, XP 10637062.

* cited by examiner

Primary Examiner—Akm Enayet Ullah
(74) Attorney, Agent, or Firm—David N. Lathrop, Esq.; Gallagher & Lathrop

(57)   ABSTRACT

A movable part formed on a substrate and adapted to be displaced in a direction parallel to the sheet surface of the substrate, a fixing part formed and fixedly mounted on the substrate, and springy hinges extending parallel to the sheet surface of the substrate and having their opposite ends connected to the movable part and the fixing part for supporting the movable part in a displaceable manner are provided. As viewed in cross section in a plane perpendicular to the lengthwise direction of the hinges, the hinge has a width which is diminishing as the top surface of the substrate is approached, thus having a trapezoidal or triangular cross section. A width as measured on the top surface of the hinge which is required to provide an equivalent spring constant can be chosen to be greater than the width of a hinge having a rectangular cross section (constant width), and this facilitates the implementation of the photolithography during the manufacture.

3 Claims, 11 Drawing Sheets

PRIOR ART

MINIATURE MOVABLE DEVICE

BACKGROUND OF THE INVENTION

The present invention relates to a miniature movable device which is manufactured with a micro-machining technique such as photolithography or etching process, and in particular, to a miniature movable device including a movable part adapted to be displaced parallel to the sheet surface of a substrate and hinges which support the movable part in a displaceable manner.

A miniature movable device of the kind described above includes a miniature optical switch, a miniature optical attenuator, a miniature accelerometer and the like, and such a miniature movable device is generally manufactured using an SOI (Silicon On Insulator) substrate having a three layer structure including a single crystal silicon substrate on which another single crystal silicon layer is superimposed with an insulating layer interposed therebetween.

FIG. 1 shows the construction of an optical switch disclosed in U.S. Pat. No. 6,315,462, issued Nov. 13, 2001 (which is referred to hereafter as a literature 1), and the construction of the optical switch will be described below as an example of a conventional arrangement of a miniature movable device manufactured using such an SOI substrate.

Four fiber channels 112a to 112d are formed in a crisscross configuration in the top surface of a sheet-like composite substrate 111 which comprises an SOI substrate, and an area which is defined between the fiber channels 112a and 112b which are perpendicular to each other represents a drive formation 111'. A slot 113 is formed in the drive formation 111' at an angle of 45° with respect to each of the fiber channels 112a and 112b, and a movable rod 114 is disposed in the slot 113.

A mirror 115 is mounted on one end of the movable rod 114, and is located at a center 116 of the fiber channels 112a to 112d which are disposed in the crisscross configuration. Support beams 117a and 117b have their one end connected to the opposite sides of the movable rod 114 at a location intermediate the length thereof, and the other ends of the support beams 117a and 117b are secured to fixing parts 119a and 119b through hinges 118a and 118b, respectively, which are in the form of leaf springs. Similarly, at the other end of the movable rod 114, support beams 117c and 117d have their one end connected to the opposite sides thereof, and the other ends of the support beams 117c and 117d are secured to fixing parts 119a and 119b through hinges 118c and 118d, respectively, which are also in the form of leaf springs, whereby the movable rod 114 is supported to be movable in the lengthwise direction thereof by the hinges 118a to 118d.

The movable rod 114 is adapted to be driven by a comb-tooth type electrostatic actuator comprising movable comb tooth electrodes 121a to 121d which are fixedly mounted on the support beams 117a to 117d, respectively, and mating fixed comb tooth electrodes 122a to 122d which are fixedly mounted on the drive formation 111'.

When a voltage is applied across the movable comb tooth electrodes 121a, 121b and the fixed comb tooth electrodes 122a, 122b, an electrostatic force of attraction is developed to move the movable rod 114 in a direction toward the center 116. On the other hand, when a voltage is applied across the movable comb tooth electrodes 121c, 121d and the fixed comb tooth electrodes 122c, 122d, a resulting electrostatic force of attraction moves the movable rod 114 in a direction away from the center 116. In this manner, by driving the movable rod 114 with the comb tooth type electrostatic actuator, the mirror 115 can be inserted into or extracted from the center 116.

Optical fibers 123a to 123d are disposed in the four fiber channels 112a to 112d, respectively, and when the mirror 115 is inserted into the center 116, light which is emitted from the optical fiber 123a, for example, is reflected by the mirror 115 to impinge on the optical fiber 123d, and light which is emitted from the optical fiber 123b is reflected by the mirror 115 to impinge the optical fiber 123c. On the other hand, when the mirror 115 is extracted from the center 116, light emitted from the optical fiber 123a impinges on the optical fiber 123c, and light emitted from the optical fiber 123b impinges on the optical fiber 123d, and a switching of the optical path takes place in this manner.

The optical switch is manufactured by a process illustrated in FIGS. 2A to 2C. Specifically, as shown in FIG. 2A, an SOI substrate 130 including a single crystal silicon substrate 131 on which another single silicon crystal layer 133 is superimposed with an insulating layer 132 formed by an silicon oxide film interposed therebetween is provided. An intended mask 134 is formed on top of the single crystal silicon layer 133 by a patterning process. Portions of the single crystal silicon layer 133 which are exposed through the mask 134 is subject to a reactive ion etching (RIE) to remove the single crystal silicon layer 133 until the insulating layer 132 becomes exposed as shown in FIG. 2B.

A narrow width portion 135 of the single crystal silicon layer 133 shown in FIG. 2B corresponds to a movable part including the movable rod 114, the mirror 115, the support beams 117a to 117d, the movable comb tooth electrodes 121a to 121d and the hinges 118a to 118d which support the movable part in a displaceable manner while a wide width portion 136 corresponds to fixing portions such as the fixing parts 119a and 119b which are fixedly mounted on the single crystal silicon substrate 131. It is to be understood that FIG. 2B is an illustrative showing of these portions.

A wet etching is applied to the exposed insulating layer 132 shown in FIG. 2B, and the etching operation is performed until the insulating layer 132 is removed by a side etching in a region which is located below the narrow width portion 135. As a consequence, the narrow width portion 135 will be located above the single crystal silicon substrate 131 with an air gap 137 therebetween, as shown in FIG. 2C. Thus, the removal of the insulating layer 132 separates the movable part and the hinges 118a to 118d which are formed by the narrow width portions 135 from the single crystal silicon substrate 131 to be displaceable. It should be noted that portions of the single crystal silicon layer 133 which form the mirror 115 are formed with reflecting films on the lateral wall surfaces.

During the etching operation applied to the single crystal silicon layer 133, as mentioned above, it is important that the etching proceeds perpendicularly with respect to the surface of the single crystal silicon layer 133 or the sheet surface of the single crystal silicon substrate 131 to form vertical sidewall surfaces. To provide an etching process which obtains vertical sidewall surfaces, PCT Application Internationally Laid-Open WO 94/14187 (issued Jun. 23, 1994, referred to hereafter as literature 2) discloses a technique which uses plasma to continue an etching step and a polymer precipitation step in an alternate fashion.

In the optical switch constructed in the manner mentioned above, the movable part can be displaced by a flexure of the hinges 118a to 118d in a direction parallel to the sheet surface of the single crystal silicon substrate 131. Accordingly, if the hinges 118a to 118d have an increased thickness or if the hinges 118a to 118d shown in plan view of FIG. 1 have an increased width measured in a direction perpendicular to the lengthwise direction thereof, their mechanical rigidity becomes larger, requiring a drive voltage of an increased magnitude to be applied to the electrostatic comb tooth actuator in order to displace the movable part.

On the other hand, because the mechanical rigidity of the hinges 118a to 118d is proportional to the third power of the thickness thereof, the thickness of the hinges 118a to 118d has a large influence upon the dynamic response of the movable part, and hence, an extremely high accuracy is required for the thickness. In order to allow an appropriate voltage of a reduced magnitude to be used, it is necessary that the thickness of the hinges 118a to 118d be very thin on the order of 1 µm, for example, but it is not a simple matter to achieve a high accuracy in this region of sizes with the photolithography. Accordingly, a difficulty has been experienced in manufacturing an optical switch including such hinges 118a to 118d.

This problem is not limited to an optical switch, but occurs in miniature movable devices of other kinds having a construction which supports a movable part on a substrate by hinges so as to be displaceable in a direction parallel to the sheet surface of the substrate in the similar manner as in the optical switch.

SUMMARY OF THE INVENTION

It is an object of the present invention to provide a miniature movable device, the manufacture of which is facilitated by allowing the width of a hinge pattern (hinge mask) which is used during the patterning in the photolithography to be chosen to be relatively large to facilitate the implementation of the photolithography while allowing the influence of a manufacturing error to be relatively small.

According to the present invention, a hinge formed on a substrate and extending parallel to the sheet surface of the substrate has a width, as viewed in cross section taken in a plane perpendicular to the lengthwise direction of the hinge, which is chosen to be reducing as the top surface of the substrate is approached.

In accordance with the present invention, the width as measured on the top surface of the hinge which is required to obtain a given spring constant can be chosen to be greater than when the hinge has a rectangular cross section, and this allows the pattern width of the hinge mask which is used during the photolithography to be increased, facilitating the implementation of the manufacture in a corresponding manner.

BRIEF DESCRIPTIONS OF THE DRAWINGS

Figure 1:
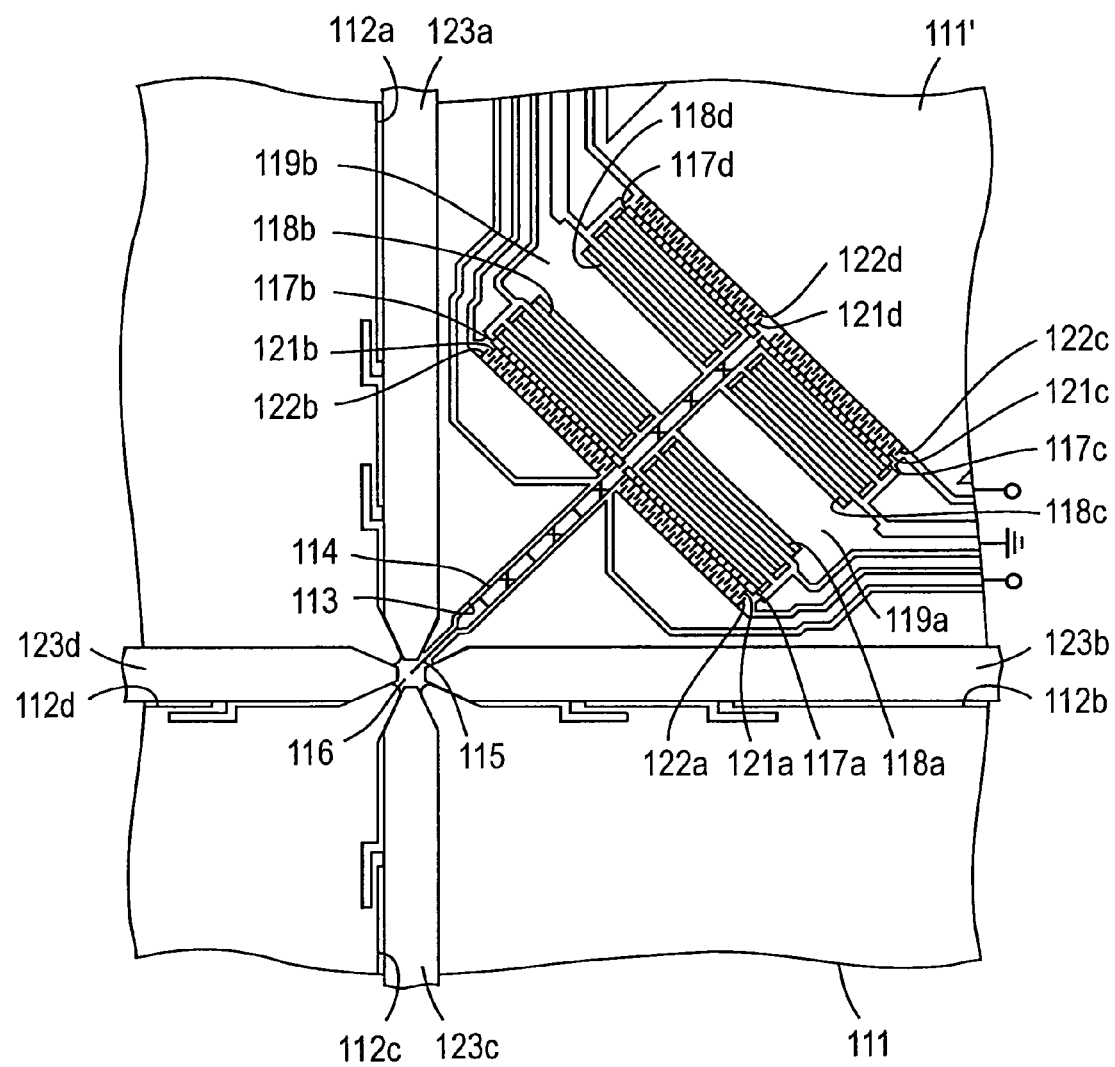
FIG. 1 is a plan view of a conventional optical switch as an example of a miniature movable device.
Figure 2A:
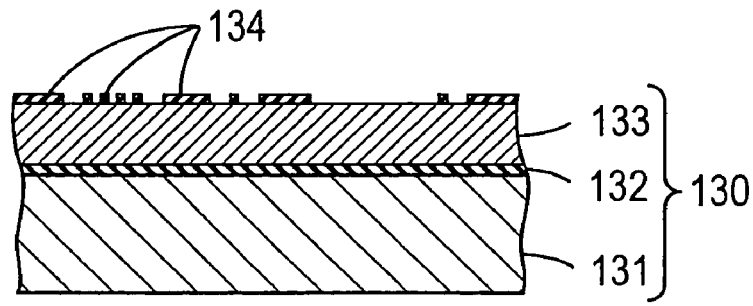
FIG. 2A illustrates a method of manufacturing the optical switch shown in FIG. 1, and is a cross section illustrating a condition when a mask is formed on top of a composite substrate formed by an SOI substrate.
Figure 2B:
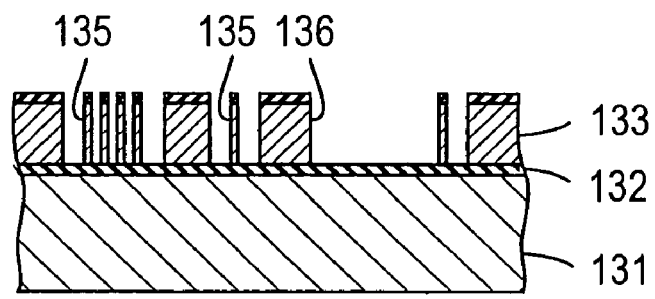
FIG. 2B is a cross section showing a condition when a device layer which is exposed through the mask shown in FIG. 2A is subject to an etching.
Figure 2C:
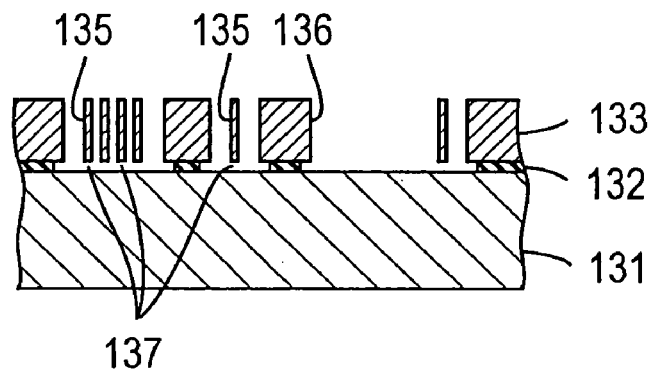
FIG. 2C is a cross section showing a condition in which an insulating layer is removed by the etching shown in FIG. 2B in regions except below fixing parts.
Figure 3:
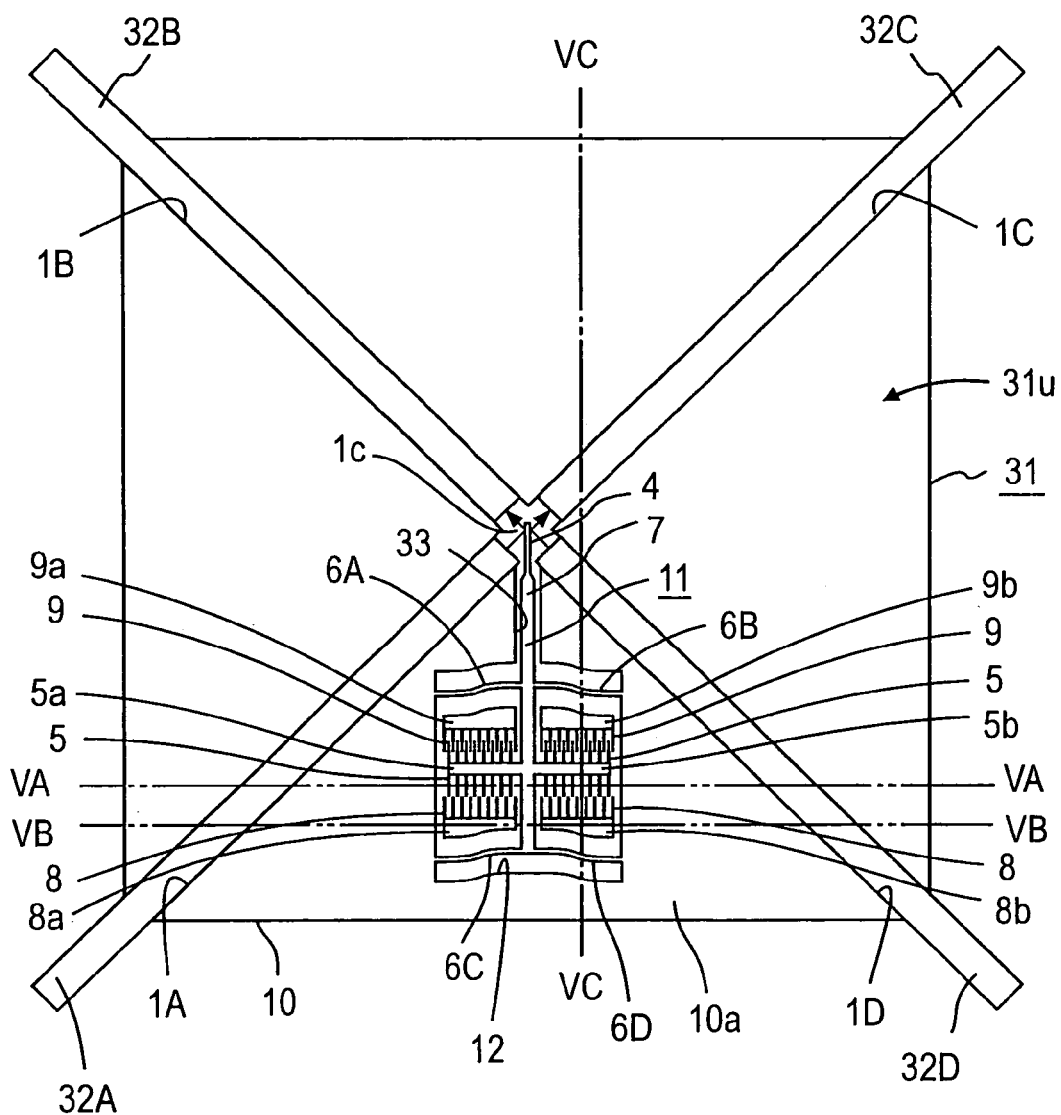
FIG. 3 is a plan view of an embodiment of the invention as applied to an optical switch.
Figure 10:
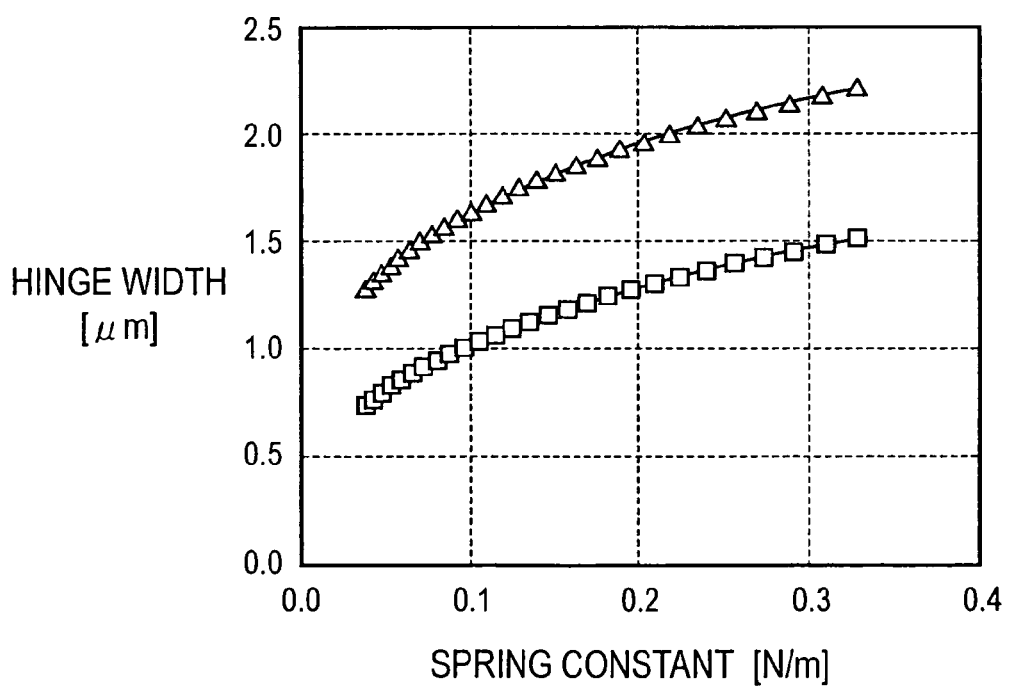
Figure 11:
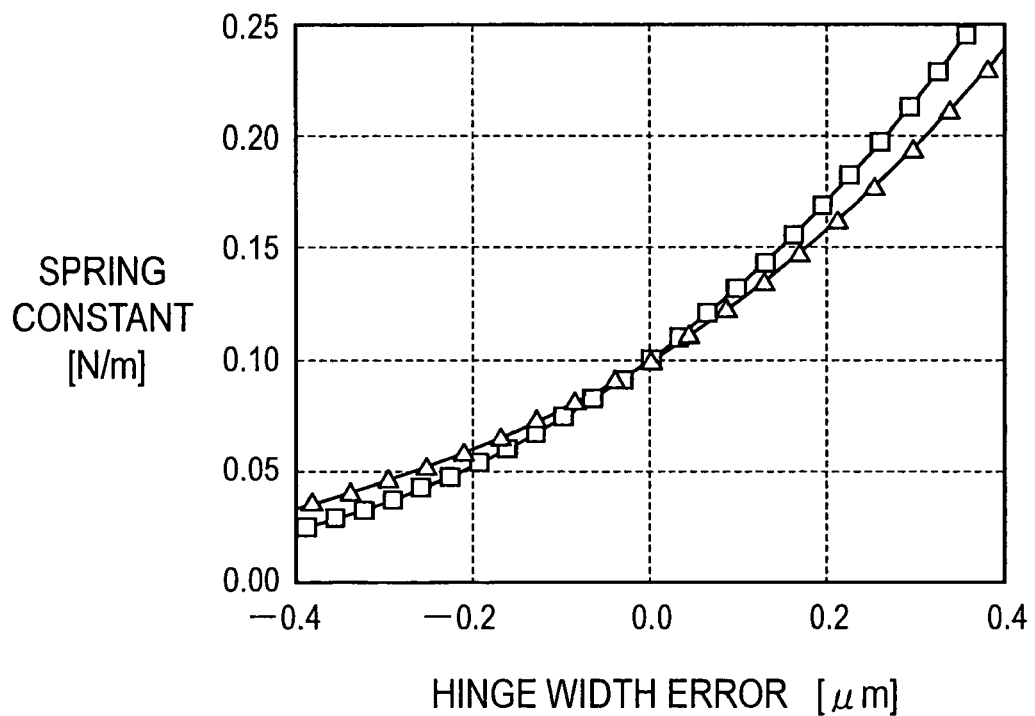
Figure 12A:
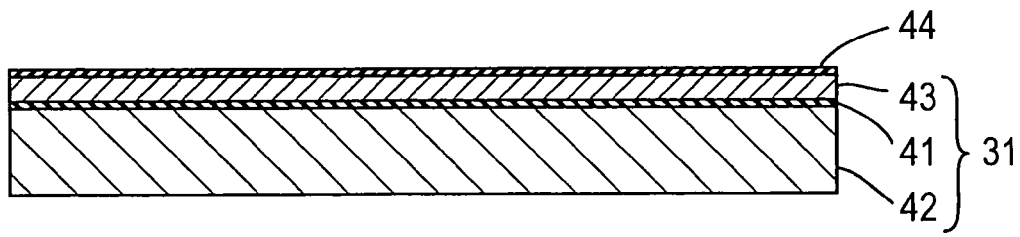
Figure 12B:
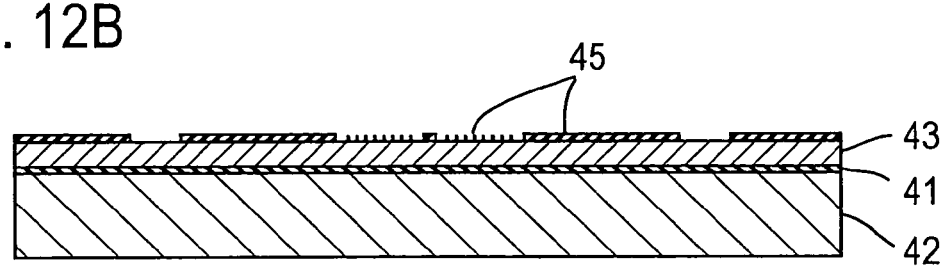
Figure 12C:
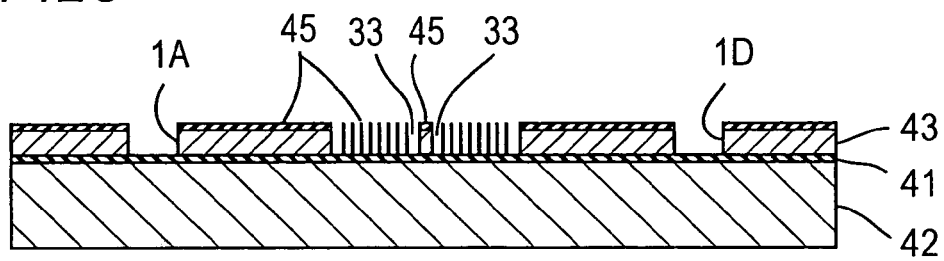
Figure 12D:
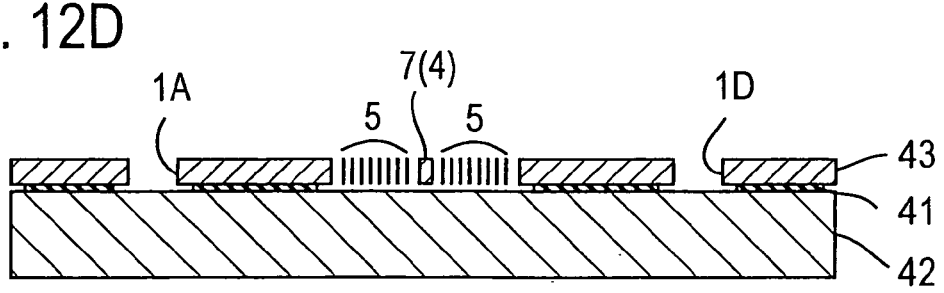

FIG. 10 graphically shows a characteristic curve representing a relationship between a width and a spring constant of a hinge;

FIG. 11 graphically shows a characteristic curve representing a relationship between an error in the hinge width and the spring constant;

FIG. 12A is a cross section taken along the line VA—VA when a layer of mask material is formed on a composite substrate formed by an SOI substrate during the manufacture of the optical switch shown in FIG. 3;

FIG. 12B is a cross section showing a condition when the layer of mask material shown in FIG. 12A is patterned to form a mask;

FIG. 12C is a cross section showing a condition when a device layer which is exposed through the mask shown in FIG. 12B is subject to an etching operation; and FIG. 12D is a cross section showing a condition when an insulating layer is removed in regions except below fixing parts by the etching operation shown in FIG. 12C.

DESCRIPTION OF PREFERRED EMBODIMENT

Referring to the drawings, the embodiment of the present invention as applied to an optical switch will be described below.

Figure 4A:
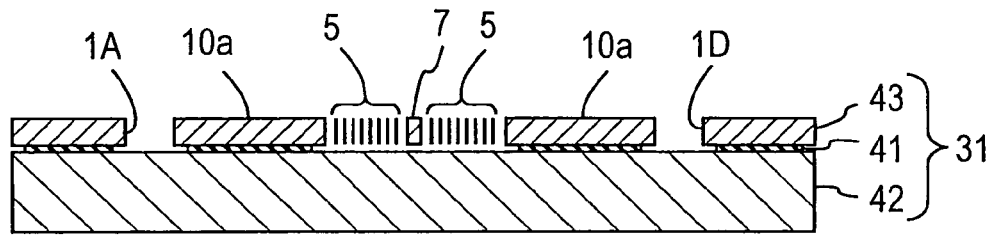
FIG. 4A is a cross section of the optical switch shown in FIG. 3 as taken along the line VA—VA.
Figure 4B:
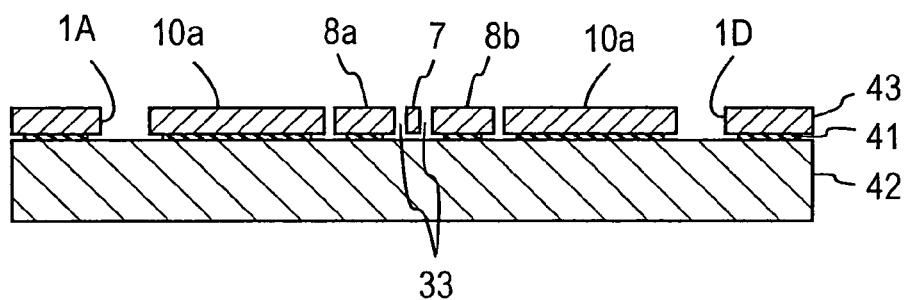
FIG. 4B is a cross section of the optical switch shown in FIG. 3 as taken along the line VB—VB.
Figure 4C:
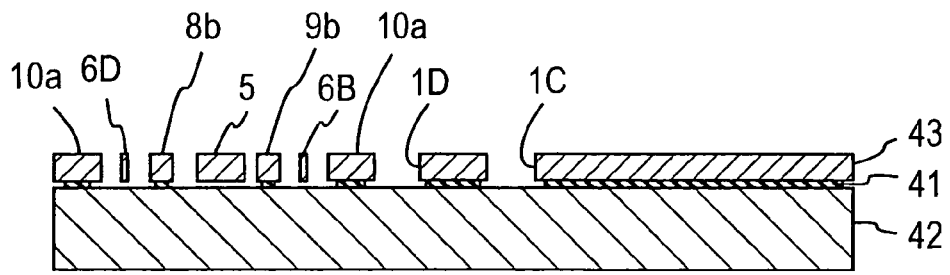
FIG. 4C is a cross section of the optical switch shown in FIG. 3 as taken along the line VC—VC.
Figure 5:
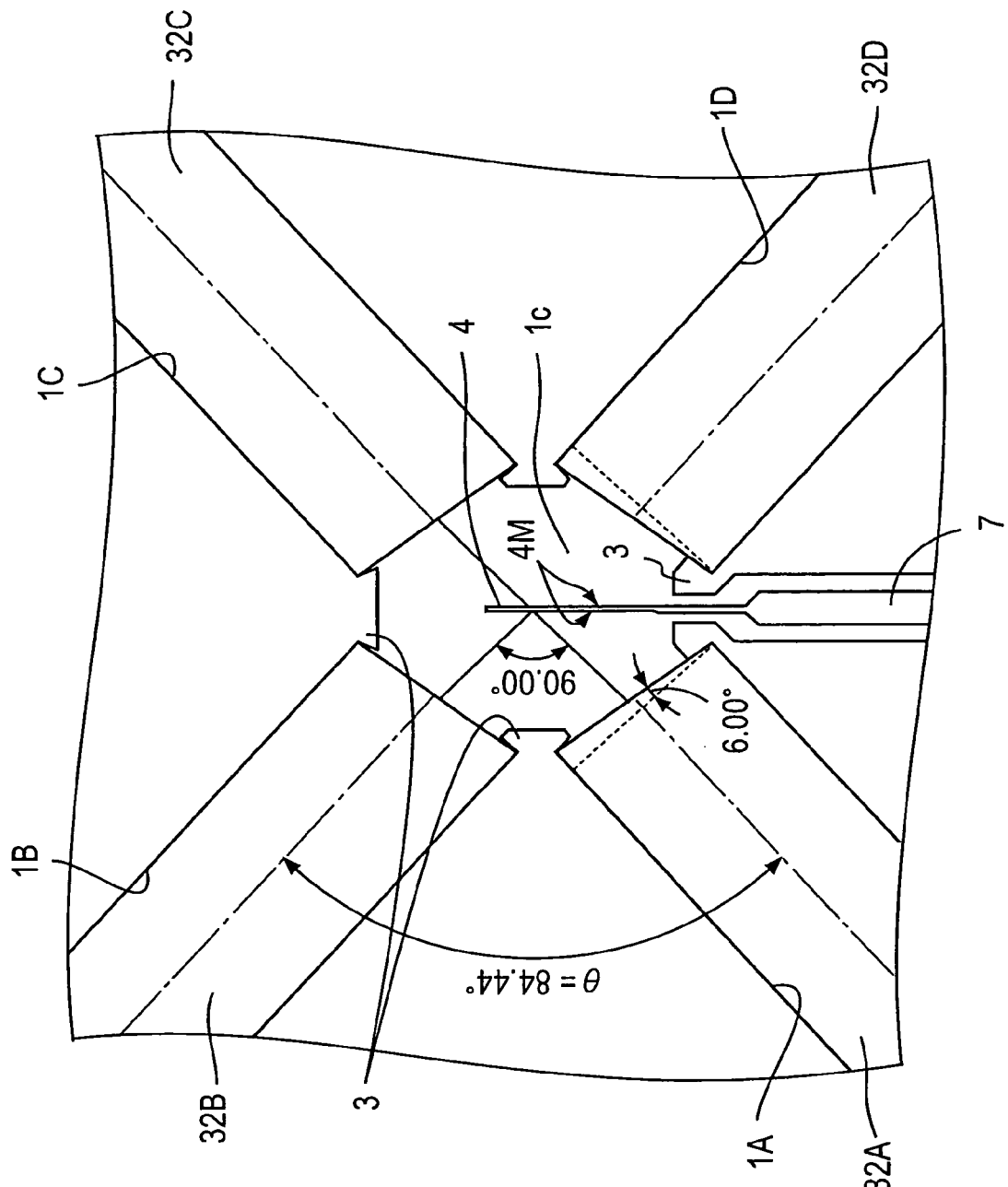
FIG. 5 is a fragmentary plan view, to an enlarged scale, of a region located around the center of crisscross fiber channels of the optical switch shown in FIG. 3.

FIG. 3 shows a plan view of the optical switch, and FIGS. 4A to 4C show cross sections of the optical switch shown in FIG. 3. In this example, the optical switch is manufactured using an SOI substrate. As shown in FIG. 3, four fiber channels 1A to 1D are formed in a crisscross configuration in the top surface 31u of a sheet-like composite substrate 31 which is formed by an SOI substrate, and optical fibers 32A to 32D are disposed in the four fiber channels 1A to 1D extending radially from the center 1c of the crisscross disposition. As shown in FIG. 5, the optical fibers 32A to 32D are received in the respective fiber channels 1A to 1D, and have their end face disposed in abutment against an abutment protection 3 disposed toward the center 1c, whereby the optical fibers 32A to 32D are positioned relative to the composite substrate 31. In this example, each of the optical fibers 32A to 32D has its end face bevelled at an angle of 6°, for example, with respect to a plane which is perpendicular to the fiber axis, and abraded to form a collimation fiber.

As shown in FIG. 3, one of four areas of the top surface 31u of the composite substrate 31 which are divided by the fiber channels 1A to 1D defines a drive formation 10. A rod channel 33 is formed in the drive formation 10 to bisect the area of the drive formation 10 and communicates with the center 1c. A recess 12 is also formed in the drive formation 10 and communicates with the end of the rod channel 33 which is located opposite from the center 1c. It is to be noted that except for the rod channel 33 and the recess 12, the remainder of the drive formation 10 forms a fixing part 10a.

A movable rod 7 is disposed in the rod channel 33, and a mirror 4 is carried by the end of the movable rod 7 disposed toward the center 1c. The movable rod 7 extends through the recess 12, and is supported on the fixing part 10a by hinges 6A to 6D in the form of leaf springs which are connected to the opposite sides of the movable rod 7 at two locations in a region thereof which is disposed within the recess 12 so as to be displaceable in the lengthwise direction thereof and parallel to the sheet surface (top surface 31u) of the composite substrate 31. In this example, the hinges 6A to 6D each assume a flexed configuration such that the sheet surfaces thereof are slightly flexed centrally along the lengthwise direction while the opposite ends are parallel to each other, whereby they can assume two stable flexure conditions which are reversed in flexure.

A comb tooth type electrostatic actuator is provided between the hinges 6A and 6B which are located intermediate the length of the movable rod 7 and the hinges 6C and 6D which are disposed at the other end of the movable rod 7 which is located opposite from the mirror 4, and includes a movable comb tooth electrode 5 which is secured to the opposite sides of the movable rod 7. In this example, the movable comb tooth electrode 5 is formed on a pair of support arms 5a and 5b which have their one end secured to the opposite sides of the movable rod 7 and extends toward the hinges 6A and 6B and toward the hinges 6C and 6D. A first and a second fixed comb tooth electrode 8 and 9 are disposed on the hinge 6C–6D side and on the hinge 6A–6B side of the movable comb tooth electrode 5 so as to mesh with the movable comb tooth electrode 5. The first and the second fixed comb tooth electrode 8 and 9 are secured to fixing parts 8a, 8b and 9a, 9b, respectively. One-half of the movable rod 7 which is disposed away from the mirror 4, the support arms 5a and 5b, the movable comb tooth electrode 5, the hinges 6A to 6D, the first and the second fixed comb tooth electrode 8 and 9, and the fixing parts 8a, 8b, 9a and 9b are disposed within the recess 12, and the fixing parts 8a, 8b, 9a and 9b are secured to the bottom surface of the recess 12 through an insulating layer 41 as will be further described later.

Figure 6:
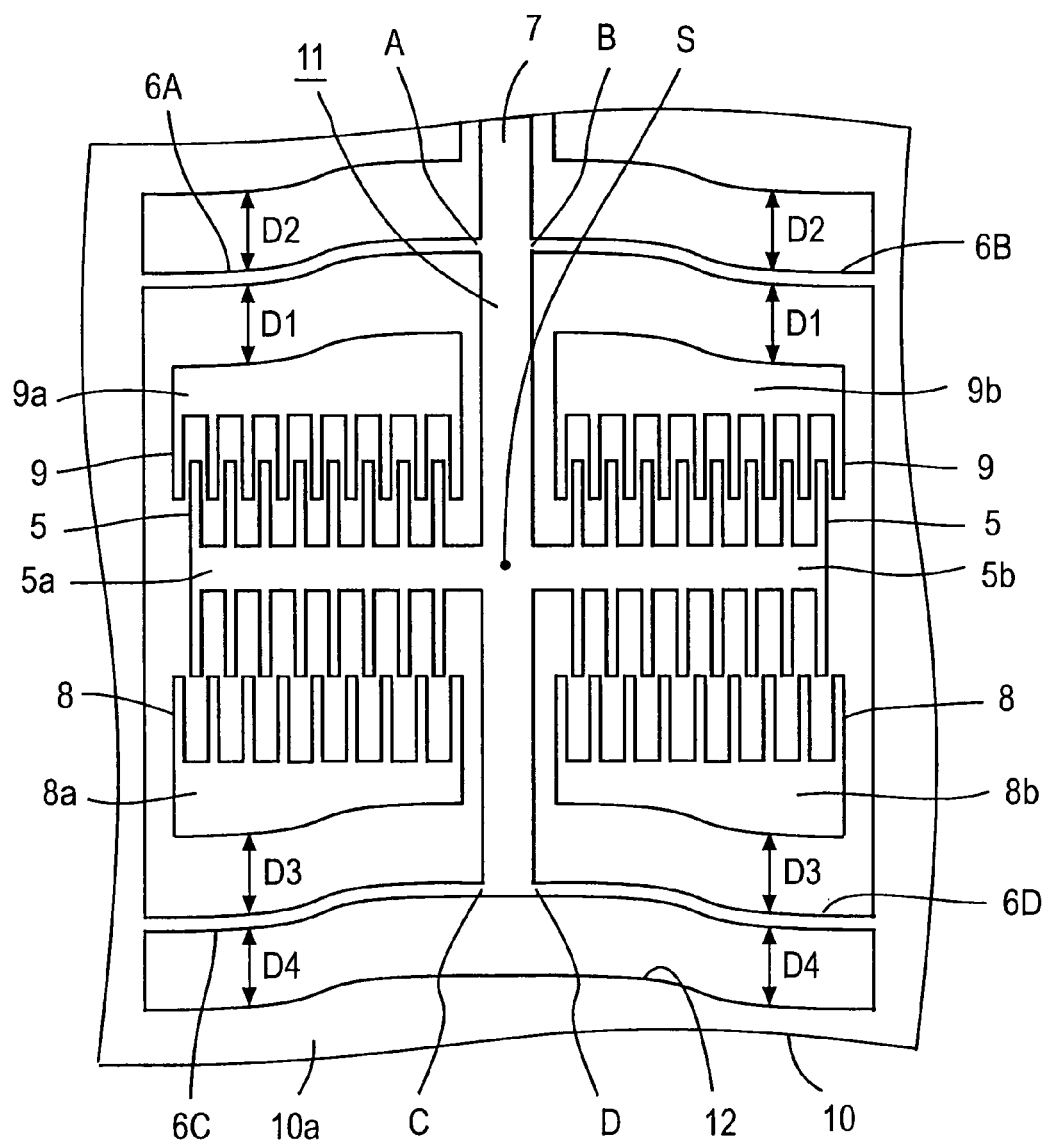
FIG. 6 is a fragmentary plan view, to an enlarged scale, of an electrostatic actuator of the optical switch shown in FIG. 3.

Wall surfaces which are located oppositely to the lateral surfaces (sheet surfaces) of the hinges 6A to 6D on the opposite sides of the hinges 6A to 6D over the length thereof are formed by the fixing part 10a and the fixing parts 8a, 8b, 9a and 9b of the first and second fixed comb tooth electrode 8 and 9. As shown in FIG. 6, in an initial condition which prevails upon manufacture of the optical switch, denoting spacings between the hinges 6A, 6B and the fixing parts 9a, 9b by D1, the spacing between the hinges 6A, 6B and the fixing parts 10a by D2, the spacing between the hinges 6C, 6D and the fixing parts 8a, 8b by D3 and the spacing between the hinges 6C, 6D and the fixing part 10a by D4, the spacings D1 to D4 are constant over the entire length of the respective hinges and D1=D2=D3=D4 in this example.

Figure 7A:
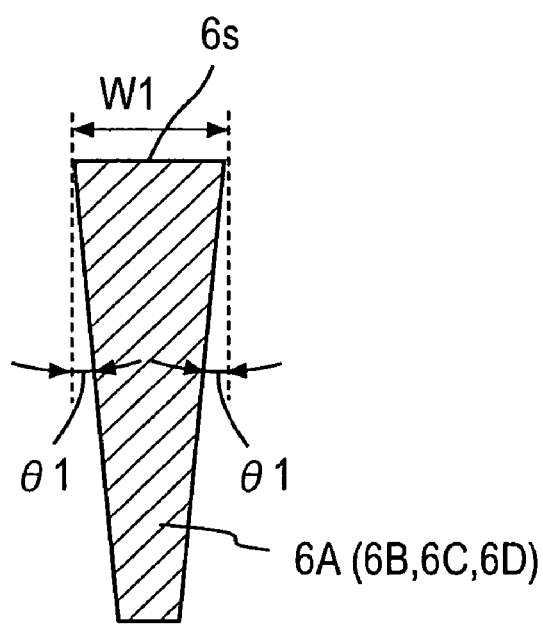
FIG. 7A is a cross section schematically illustrating one form of cross-sectional configuration of a hinge used in the optical switch shown in FIG. 3.
Figure 7B:
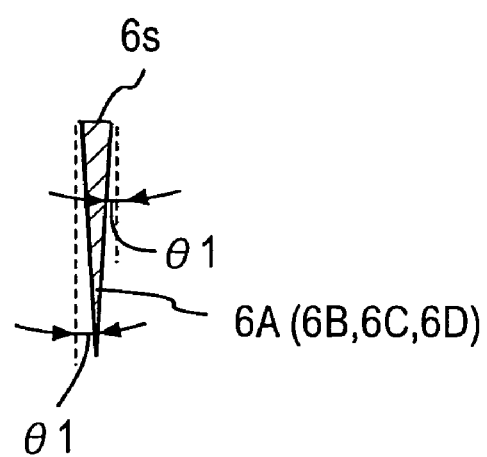
FIG. 7B is a cross section schematically illustrating another form of the cross-sectional configuration of a hinge used in the optical switch shown in FIG. 3.

In the present example, the cross-sectional configuration in a plane perpendicular to the lengthwise direction of each of the hinges 6A to 6D is either trapezoidal or triangular as shown in FIG. 7A or 7B and the width is at its maximum on the surface (top surface) 6s which lies on the top surface 31u of the composite substrate 31, the both lateral surfaces being slightly inclined, for example, with an angle of $\theta 1=0.5°$, to provide tapered surfaces.

The hinges 6A to 6D have two stable flexure conditions which are reversed in flexure. Accordingly, in the initial configuration (first stable condition) which is assumed upon manufacture of the optical switch, the mirror 4 is inserted into the center 1c as an example. At this time, light which is emitted from the optical fiber 32A is reflected by the mirror 4 to impinge on the optical fiber 32B, and light emitted from the optical fiber 32D is reflected by the mirror 4 to impinge on the optical fiber 32C.

Figure 8:
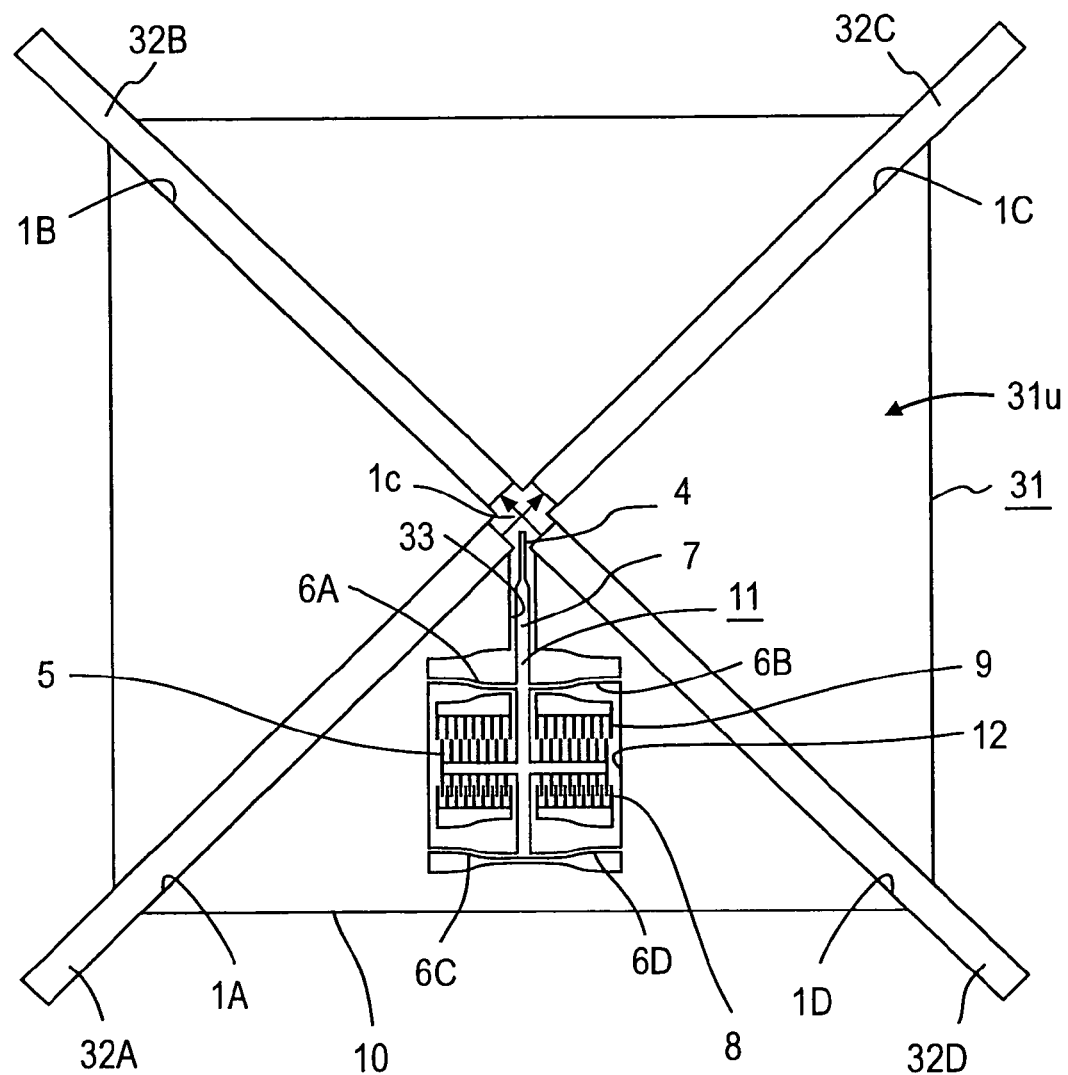
FIG. 8 is a plan view illustrating a condition of the optical switch shown in FIG. 3 in which the mirror is extracted from the center of fiber channels.

When a voltage is applied to the first fixed comb tooth electrode 8 while connecting the second fixed comb tooth electrode 9 and the fixing part 10a which is electrically connected to the movable comb tooth electrode 5 through the support arms 5a and 5b, the movable rod 7 and the hinges 6A to 6D to the ground, an electrostatic force of attraction acts between the first fixed comb tooth electrode 8 and the movable comb tooth electrode 5, and if this force is greater than the force which tends to hold the first stable condition, the hinges 6A to 6D reverse to their second stable condition and is maintained in this condition by a self-holding action if the voltage ceases to be applied. As shown in FIG. 8, the mirror 4 is retracted from the center 1c at this time, and accordingly, light emitted from either optical fiber 32A or 32D impinges on the optical fiber 32C or 32B, respectively. When a voltage is applied to the second fixed comb tooth electrode 9 while the fixing part 10a and the first fixed comb tooth electrode 8 are connected to the ground, an electrostatic force of attraction acts between the second fixed comb tooth electrode 9 and the movable comb tooth electrode 5, and if this force is greater than the force which tends to hold the second stable condition, the hinges 6A to 6D revert to the first stable condition again.

In order to apply a voltage across either the first or the second fixed comb tooth electrode 8 or 9 and the movable comb tooth electrode 5, bonding wires may be connected to the fixing parts 8a, 8b and 9a, 9b which are secured to the first and the second fixed comb tooth electrodes 8 and 9, and the voltage may be applied across these bonding wires and the fixing part 10a.

In this optical switch, the movable part 11 including the mirror 4, the movable rod 7, the support arms 5a and 5b and the movable comb tooth electrode 5 are supported by the hinges 6A to 6D in a displaceable manner, and the movable part 11 except for the mirror 4 is constructed to exhibit an axial symmetry with respect to the centerline of the movable rod 7. Points A, B, C and D where the movable rod 7 is supported by the four hinges 6A, 6B, 6C and 6D (or points where the hinge reaction acts) are located at positions which are symmetrical with respect to the point of connection between the support arms 5a and 5b and the movable rod 7 (or point S where the drive acts).

In addition, the point S where the drive acts is designed to be substantially in coincidence with the center of gravity of the movable part 11. As a result of such a construction, it follows that if a drive from the electrostatic actuator contains a vector component which is directed in a direction different from a desired direction in which the movable part 11 is to be driven, the reactions from the four hinges 6A to 6D act equally upon the undesired vector component in the drive, thus effectively suppressing the movement of the movable part 11 in a direction other than the intended direction in which it is to be driven.

In the event an external disturbance such as impact is applied, two structural features that the four hinges 6A to 6D are disposed at positions which are symmetrical with respect to the center of gravity of the movable part 11 and that the movable comb tooth electrode 5 which represents a heavy structure is equally supported by the four hinges 6A to 6D allow an unintended movement of the movable part 11 to be effectively suppressed.

As mentioned previously, the both lateral surfaces of the hinges 6A to 6D are inclined to provide tapered surfaces, and accordingly, the width as viewed in cross section becomes narrower from the top surface 6s toward the downward direction. Accordingly, the width of the top surface 6s of each of the hinges 6A to 6D which is required to provide an equivalent spring constant can be chosen to be greater than the width which is required for hinges having rectangular cross-sectional configuration, and this facilitates the implementation of the photolithography when the hinge mask used during the manufacture of the optical switch is formed in a corresponding manner. An increased width of the top surface 6s reduces the influence of a manufacturing error.

Figure 9:
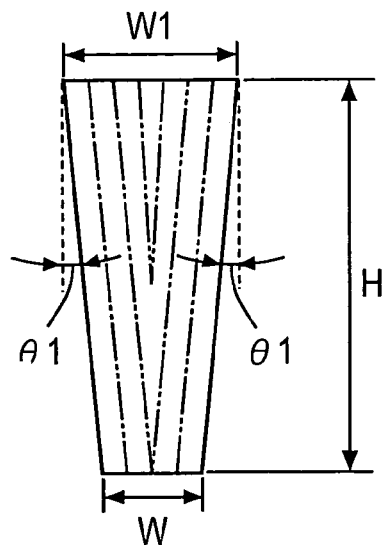
FIG. 9 is a cross section schematically illustrating the configuration of a hinge having different widths.

A relationship between a hinge width W1 and the spring constant is graphically shown in FIG. 10 and a relationship between an error in the hinge width and the spring constant is graphically shown in FIG. 11 for hinges having trapezoidal or triangular cross sections as illustrated by a cross-sectional configuration for hinge 6A (6B to 6D) in FIG. 9 where the angle of inclination of the lateral surface of θ1 is assumed to be a given value (0.5°) and having various values for the width W1 of the top surface 6s and for hinges having rectangular cross sections and having corresponding widths and heights as the hinges having a trapezoidal or triangular cross section. It is to be noted that a hinge height H shown in FIG. 9 is chosen to be 100 μm. In FIGS. 10 and 11, a triangle mark (□) indicates a hinge having a trapezoidal or triangular cross section and a square mark (□) indicates a hinge having a rectangular section.

It is seen from FIG. 10 that for an equal spring constant, a hinge having a trapezoidal or triangular cross section can have a width W1 of the top surface 6s which is by 0.6 μm or more greater than a hinge having a rectangular section. It is seen from FIG. 11 that as an error in the width W1 increases, the rate at which the spring constant changes is less in a hinge having a trapezoidal or triangular cross section than for a hinge having a rectangular cross section, allowing a greater manufacturing error for an equal error in the spring constant for the hinge having a trapezoidal or triangular cross section.

A method of manufacturing the optical switch constructed in the manner mentioned above will now be described with reference to FIGS. 12A to 12D, which show sections taken along the line VA—VA shown in FIG. 3 during several steps.

As shown in FIG. 12A, a three layer SOI substrate including a single crystal silicon substrate 42 on which an insulating layer 41 formed by a silicon oxide film is disposed and in which a silicon single crystal layer 43 is disposed on top of the insulating layer 41 is provided. In this example, the SOI substrate defines the composite substrate 31. The single crystal silicon substrate 42 may have a thickness of 350 μm, for example, and the insulating layer 41 may have a thickness of 3 μm, for example. The silicon single crystal layer 43 may have a thickness of 100 μm, for example. In the description to follow, the silicon single crystal layer 43 will be referred to as a device layer 43.

A layer of mask material 44 is formed on top of the device layer 43. The mask material for the layer 44 may comprise a silicon oxide film, for example.

Using the photolithography and the etching technique, the layer of mask material 44 is patterned to form a mask 45 as shown in FIG. 12B, the mask defining the configuration of the movable part 11 comprising the mirror 4, the movable rod 7, the support arms 5a and 5b and the movable comb tooth electrode 5, the hinges 6A to 6D which support the movable part 11, the fixing parts 10a, 8a, 8b, 9a and 9b and the first and the second fixed comb tooth electrode 8 and 9 and also defining the positions of the fiber channels 1A to 1D.

Subsequently, a gas reactive dry etching which uses ICP (Inductively Coupled Plasma) is performed upon the device layer 43 utilizing the mask 45, the dry etching taking place substantially perpendicularly to the sheet surface of the composite substrate 31 until the insulating layer 41 becomes exposed. This etching operation forms various structures such as the movable part 11, the fixing part 10a and the like from the device layer 43. The deep etching which takes place by the dry etching uses a technique as disclosed in the literature 2, for example, in which the etching step and the polymer precipitation step take place in alternate succession. In the implementation of such method, where etched sidewall surfaces of the device layer 43 should be made as perpendicular to the sheet surface of the single crystal silicon substrate 42 as possible, a choice is made to exercise the etching step relatively strongly, and to exercise the polymer precipitation step relatively weakly. Specifically, the time interval for the polymer precipitation step is reduced slightly while the time interval for the etching step is slightly increased. In this manner, a side etching below the mask takes place in an appropriate manner, producing desired tapered surfaces for the both lateral surfaces of the hinges 6A to 6D.

Producing tapered surfaces for the both lateral surfaces of the hinges 6A to 6D by utilizing a degree of side etching can be achieved by an adjustment of one or more of other etching conditions including the electric power, the gas flow rate, the temperature and the gas pressure, thus adjusting one or more of these conditions. What conditions are to be used can be easily determined experimentally depending on the angle of inclination θ1 of the intended tapered surfaces.

After the surface of the device layer 43 is cleansed, it is immersed in a solution which exhibits an anisotropy of the etching rate with respect to the insulating layer 41, for example, a 50% solution of fluoric acid (HF) (or a mixed solution of hydrofluoric acid and ammonium flouride) to etch the exposed insulating layer 41. An etching time interval is chosen so that the insulating layer 41 is completely removed in regions corresponding to the movable part 11 including the mirror 4, the movable comb tooth electrode 5 and the movable rod 7, the hinges 6A to 6D and the first and the second fixed comb tooth electrode 8 and 9, as shown in FIG. 12D, but the insulating layer 41 is only marginally and slightly removed in regions such as corresponding to the fixing part 10a and the fixing parts 8a, 8b and 9a, 9b which should remain fixed to the single crystal silicon substrate 42. As a result of the etching operation, the movable part 11 is supported by the hinges 6A to 6D so as to be movable on the fixing part 10a and is displaceable over the single crystal silicon substrate 42 in a direction parallel to the sheet surface thereof. In this example, a same material is used for the insulating layer 41 and the layer of mask material 44, and accordingly, the mask 45 is simultaneously removed.

The both lateral surfaces of the mirror 4 are coated by a metal having a high reflectivity such as Au/Pt/Ti multilayer film, for example, as by sputtering, thus forming the mirror surfaces.

It is to be noted that in this example, spacings D1 to D4 between the hinges 6A to 6D and wall surfaces disposed on the opposite sides of the respective hinges 6A to 6D are made so that D1=D2=D3=D4 and so that a spacing between each of the hinges 6A to 6D and the wall surfaces disposed on the opposite sides thereof remains equal to each other at every point in the lengthwise direction of each of the hinges 6A to 6D, thus avoiding a condition that a liquid remains only on one side of each of the hinges 6A to 6D during the drying step which follows the wet etching and a consequent problem that hinges 6A to 6D are attracted by the surface tension of the liquid which remains on one side to cause them to be held attracted to the wall surfaces after the drying step.

The application of the present invention is not limited to the optical switch mentioned above, but the present invention is also applicable to a sensor or an actuator such as a miniature light attenuator which comprises a light shielding plate substituted for the mirror of the optical switch or a miniature accelerometer which comprises a mass carrier substituted for the mirror and an electrostatic displacement sensor substituted for the electrostatic actuator of the optical switch which calls for a flexibility of springy hinges and a high accuracy spring constant specification, bringing forth an advantage that the implementation of the photolithography during the manufacture is facilitated.

By way of example, a hinge is not limited to one having two distinct stable flexure conditions, and in a miniature movable device which is different from the optical switch mentioned above and which is not provided with a mirror surface, the angle of inclination $\theta1$ for the both lateral surfaces of the hinge may be greater than 0.5° which is given in the above example.

In the described optical switch, the both lateral surfaces of the hinge has an angle of inclination equal to 0.5°, but a preferred range for the angle of inclination $\theta1$ in such an optical switch will now be described.

In the optical switch, the mirror surface which is formed by the etching operation simultaneously with a hinge will have the same angle of inclination $\theta1$ as the hinge, but such inclination of the mirror surface would produce a loss for a light coupling between optical fibers which are disposed in a common plane.

In the optical switch, the optical fiber is generally provided with a collimation fiber at the free end thereof so that emitted light is condensed to define a beam waist at the position of the mirror surface. Light loss which is caused by the inclination of the mirror surface depends on the magnitude of the diameter of the beam waist, and an increased diameter of the beam waist increases the loss caused by the mirror surface while the reduced diameter of the beam waist reduces such loss.

The diameter of the beam waist is adjusted by the design of a collimation fiber, and the preferred range of adjustment is on the order of 2.0 to 30.0 $\mu$m for light flux emitted from a single mode optical fiber. On the other hand, there are many other factors which causes the light losses of the optical switch, and in consideration of this, a realistic permissible loss which is attributable to the inclination of the mirror surface will be on the order of 0.1 to 0.3 dB.

Calculating light loss caused by the inclination of the mirror surface for a light wavelength of 1.55 $\mu$m and a horizontal angle of incidence of 45°, results are obtained such that 1) an inclination which produces a maximum permissible loss of 0.3 dB at the minimum diameter 2.0 $\mu$m of the beam waist or a maximum angle of inclination which can be practically possible is equal to 5.25°; and
2) an inclination which produces a minimum permissible loss of 0.1 dB at the maximum diameter 30.0 $\mu$m of the beam waist or a minimum angle of inclination which is practically possible is equal to 0.20°.

Accordingly, in the optical switch, a practical range of the angle of inclination $\theta1$ in which the present invention can be effectively carried out can be concluded as a range from 0.2° to 5.0°.

What is claimed is:

1. A miniature movable device comprising a movable part formed on a substrate and adapted to be displaced in a direction parallel to the sheet surface of the substrate, a fixing part formed and fixedly mounted on the substrate, and a springy hinge extending parallel to the sheet surface of the substrate and having its opposite ends connected to the movable part and to the fixing part for supporting the movable part in a displaceable manner;

wherein the hinge has a width as measured in its cross section in a plane which is perpendicular to the lengthwise direction of the hinge which is diminishing toward the top surface of the substrate.

2. A miniature movable device according to claim 1 in which the hinge has a trapezoidal cross section.

3. A miniature movable device according to claim 1 in which the hinge has a triangular cross section.

* * * * *